US012770756B2

(12) United States Patent
Hongo et al.

(10) Patent No.: US 12,770,756 B2
(45) Date of Patent: Oct. 20, 2026

(54) SHIELDING WIRE

(71) Applicant: Yazaki Corporation, Tokyo (JP)

(72) Inventors: Satoko Hongo, Susono (JP); Naoya Takahashi, Susono (JP)

(73) Assignee: Yazaki Corporation, Tokyo (JP)

( * ) Notice: Subject to any disclaimer, the term of this patent is extended or adjusted under 35 U.S.C. 154(b) by 194 days.

(21) Appl. No.: 18/821,434

(22) Filed: Aug. 30, 2024

(65) Prior Publication Data

US 2025/0095878 A1 Mar. 20, 2025

(30) Foreign Application Priority Data

Sep. 15, 2023 (JP) ................................ 2023-150175

(51) Int. Cl.
*H01B 7/02* (2006.01)

(52) U.S. Cl.
CPC .................................. *H01B 7/0241* (2013.01)

(58) Field of Classification Search
CPC .......... H01B 1/02; H01B 1/023; H01B 1/026; H01B 1/04; H01B 1/24; H01B 3/441; H01B 3/305; H01B 3/306; H01B 3/40; H01B 7/02; H01B 7/0241; H01B 7/08; H01B 7/18; H01B 7/1855; H01B 7/22; H01B 7/29; H01B 7/30; H01B 9/02; H01B 9/023; H01B 9/04; H01B 11/10; H01B 11/1008; H01B 11/18; H01B 11/1813; H01B 11/1817; H01B 11/1869; H01B 13/01; H01B 13/0165; B32B 15/08
USPC ......... 174/27, 36, 102 R–108, 110 R–113 R; 428/200, 201, 209, 344, 345, 349
See application file for complete search history.

(56) References Cited

U.S. PATENT DOCUMENTS 2,045,104 A * 6/1936 Rosch .................... H01B 7/226 174/109
2,298,748 A * 10/1942 Brown ................. H01B 7/1875 66/190
2,852,423 A * 9/1958 Bassett, Jr. ................ C09J 7/29 174/109
3,795,540 A * 3/1974 Mildner ................. H01B 3/441 174/105 B (Continued)

FOREIGN PATENT DOCUMENTS

JP 2019-075375 A 5/2019
JP 2021-103775 A 7/2021
JP 2021-140950 A 9/2021

*Primary Examiner* — William H. Mayo, III
(74) *Attorney, Agent, or Firm* — Banner & Witcoff, Ltd.

(57) ABSTRACT

A shielding wire includes: an electric wire; and a conductive nonwoven fabric tape. The conductive nonwoven fabric tape includes a conductive nonwoven fabric and an adhesive layer. The adhesive layer adheres to the electric wire and adheres to the conductive nonwoven fabric tape that overlaps when wound in a spiral shape. Relationships of: $S/tL \leq 0.5$; and $(S1-S2)/tL \geq 0.25$ are satisfied, in which t is a width of the conductive nonwoven fabric tape wound in a spiral shape, L is a length of the conductive nonwoven fabric tape, S is an area of the adhesive layer in the conductive nonwoven fabric tape, S1 is an area of a lapped portion where the conductive nonwoven fabric tape overlaps when the conductive nonwoven fabric tape is wound in a spiral shape, and S2 is an area of the adhesive layer in the lapped portion.

3 Claims, 9 Drawing Sheets

(56) References Cited

U.S. PATENT DOCUMENTS

| | | | | | |
|---|---|---|---|---|---|
| 4,045,607 | A * | 8/1977 | Swearingen | H01B 3/44 428/209 |
| 4,268,714 | A * | 5/1981 | Mori | B32B 15/12 174/109 |
| 4,322,574 | A * | 3/1982 | Bow | H01P 1/30 428/377 |
| 5,956,445 | A * | 9/1999 | Deitz, Sr. | G02B 6/4436 385/100 |
| 6,261,683 | B1 * | 7/2001 | Tanaka | H01B 7/0861 428/377 |
| 2004/0026101 | A1 * | 2/2004 | Ochi | H01B 11/1091 174/36 |
| 2012/0000692 | A1 * | 1/2012 | Tsuchiya | H01R 13/6599 29/877 |
| 2016/0314873 | A1 * | 10/2016 | Hayashishita | H01B 3/40 |
| 2020/0020462 | A1 * | 1/2020 | Garrett | H01B 11/1869 |
| 2022/0007553 | A1 | 1/2022 | Koyama et al. | |

* cited by examiner

| | COMPARATIVE EXAMPLE 1 | EXAMPLE 1 | EXAMPLE 2 | EXAMPLE 3 |
|---|---|---|---|---|
| CONDUCTION RATIO [%] (FORMULA (2)) | 50 | 35 | 25 | 25 |
| PLAN VIEW |  |  |  |  |
| ADHESION RATIO [%] (FORMULA (1)) | 0 | 30 | 50 | 50 |
| LAP WIDTH | 1/2 | 1/2 | 1/2 | 1/2 |

| | COMPARATIVE EXAMPLE 2 | COMPARATIVE EXAMPLE 3 | COMPARATIVE EXAMPLE 4 |
|---|---|---|---|
| CONDUCTION RATIO [%] (FORMULA (2)) | 15 | 25 | 13 |
| PLAN VIEW |  |  |  |
| ADHESION RATIO [%] (FORMULA (1)) | 70 | 0 | 50 |
| LAP WIDTH | 1/2 | 1/4 | 1/4 |

| | VERTICAL ATTACHMENT EXAMPLE 1 | VERTICAL ATTACHMENT EXAMPLE 2 | VERTICAL ATTACHMENT EXAMPLE 3 | VERTICAL ATTACHMENT EXAMPLE 4 | VERTICAL ATTACHMENT EXAMPLE 5 |
|---|---|---|---|---|---|
| ADHESION RATIO [%] (FORMULA (1)) | 0 | 30 | 50 | 50 | 70 |
| PLAN VIEW |  |  |  |  |  |
| CROSS-SECTIONAL VIEW |  |  |  |  |  |

SHIELDING WIRE

CROSS-REFERENCE TO RELATED APPLICATION(S)

This application is based upon and claims the benefit of priority from prior Japanese patent application No. 2023-150175 filed on Sep. 15, 2023, the entire contents of which are incorporated herein by reference.

BACKGROUND

1. Field of the Invention

The present disclosure relates to a shielding wire.

2. Description of the Related Art

In the related art, a shielding wire has been proposed in which a conductive nonwoven fabric having a nonwoven fabric and a metal layer formed on a surface of the nonwoven fabric is disposed around an outer periphery of an electric wire (for example, see JP2019-75375A). The shielding wire exhibits an electromagnetic shielding effect due to the metal layer of the conductive nonwoven fabric, while has relatively excellent stretchability and compression properties and can follow the bending of the electric wire due to characteristics of the nonwoven fabric. Such a conductive nonwoven fabric is provided with an adhesive layer on one surface to form a conductive nonwoven fabric tape (for example, see JP2021-140950A and JP2021-103775A), and can be attached around the periphery of the electric wire using the adhesive layer.

However, when the conductive nonwoven fabric tape as described in JP2021-140950A and JP2021-103775A is vertically attached around the periphery of the electric wire, a lapped portion of the conductive nonwoven fabric tape may come apart at the time of bending, and the shielding effect may be reduced. Further, when the conductive nonwoven fabric tape is wound in a spiral shape, a lapped portion also becomes spiral, making it difficult for the lapped portion to open at the time of bending. However, since an adhesive layer is interposed between upper and lower conductive nonwoven fabrics in the lapped portion, a conductive path also becomes spiral, resulting in a significant decrease in the shielding effect.

To address such problems, the present applicant has made an invention related to Japanese Patent Application No. 2022-191625. In Japanese Patent Application No. 2022-191625, the conductive nonwoven fabric tape is wound in a spiral shape on the electric wire. The conductive nonwoven fabric tape has, for example, an adhesive layer provided only on one end of the conductive nonwoven fabric. When the conductive nonwoven fabric tape is wound in a spiral shape, no adhesive layer is interposed between lapped portions of the conductive nonwoven fabric. As a result, the conductive nonwoven fabric wound in a spiral shape forms a conductive path along a longitudinal direction of the electric wire through the lapped portions, thereby preventing a significant decrease in the shielding effect.

However, the conductive nonwoven fabric tape mentioned above requires the formation of an adhesive layer with a width that matches the width of the lapped portion, which means that an adhesive layer is formed for each winding state and target electric wire (electric wire diameter and the like), resulting in low versatility (each product is unique). Further, when the conductive nonwoven fabric tape mentioned above has an adhesive layer formed only on one end of the conductive nonwoven fabric in a width direction, if it is used vertically, the conductive nonwoven fabric may float away from the electric wire, reducing the shielding effect.

SUMMARY

The present disclosure has been made in order to solve such a problem in the related art, and an object of the present disclosure is to provide a shielding wire capable of increasing the versatility of a conductive nonwoven fabric tape and reducing a decrease in the shielding effect.

According to an aspect of the present disclosure, there is provided a shielding wire including: an electric wire; and a conductive nonwoven fabric tape wound around the electric wire, in which: the conductive nonwoven fabric tape includes a conductive nonwoven fabric that is a nonwoven fabric having electrical conductivity and an adhesive layer formed on one surface of the conductive nonwoven fabric; in the conductive nonwoven fabric tape, the adhesive layer is partially formed on the conductive nonwoven fabric; when the conductive nonwoven fabric tape is wound in a spiral shape around the electric wire, the adhesive layer adheres to the electric wire and also adheres to the conductive nonwoven fabric tape that overlaps when wound in a spiral shape; and relationships of: $S/tL \leq 0.5$; and $(S1-S2)/tL \geq 0.25$ are satisfied, in which t is a width of the conductive nonwoven fabric tape wound in a spiral shape, L is a length of the conductive nonwoven fabric tape, S is an area of the adhesive layer in the conductive nonwoven fabric tape, S1 is an area of a lapped portion where the conductive nonwoven fabric tape overlaps when the conductive nonwoven fabric tape is wound in a spiral shape, and S2 is an area of the adhesive layer in the lapped portion.

According to the present disclosure, it is possible to provide a shielding wire capable of increasing the versatility of a conductive nonwoven fabric tape and reducing a decrease in the shielding effect.

BRIEF DESCRIPTION OF THE DRAWINGS

The present disclosure will become more fully understood from the detailed description given hereinbelow and the accompanying drawing which is given by way of illustration only, and thus is not limitative of the present disclosure and wherein.

DETAILED DESCRIPTION OF THE INVENTION

Hereinafter, the present disclosure will be described with reference to a preferred embodiment. The disclosure is not limited to the embodiments to be described below, and the embodiments can be appropriately changed without departing from the scope of the disclosure. In the embodiments described below, there may be portions in which illustration and description of a part of a configuration are omitted, and it is needless to say that a known or well-known technique is appropriately applied to the details of the omitted technique within a range in which no contradiction with the contents described below occurs.

Figure 1:
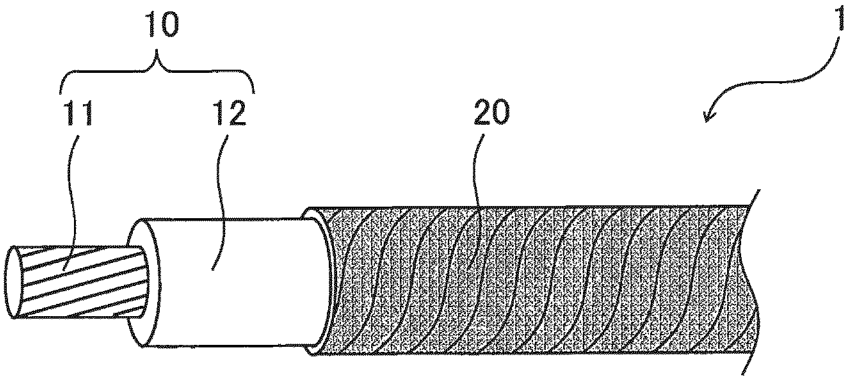
FIG. 1 is a perspective view showing a shielding wire according to an embodiment of the present disclosure.

FIG. 1 is a perspective view showing a shielding wire 1 according to an embodiment of the present disclosure. As shown in FIG. 1, the shielding wire 1 according to the present embodiment includes an electric wire 10 and a conductive nonwoven fabric tape 20 wound in a spiral shape around the electric wire 10. In the shielding wire 1 of the example shown in FIG. 1, the conductive nonwoven fabric tape 20 is wound in a spiral shape, but is not limited to a spiral shape, and the conductive nonwoven fabric tape 20 may be attached vertically. The number of electric wires 10 in FIG. 1 is one, but the number is not limited to one, and may be two or more.

The electric wire 10 includes a conductor 11 made of, for example, copper, aluminum, or an alloy thereof, and an insulating covering portion 12 covering the conductor 11. In the example shown in FIG. 1, the conductor 11 of the electric wire 10 is a twisted wire obtained by twisting a plurality of wires, but is not limited to this and may be a solid wire. Further, the covering portion 12 is assumed to be made of polyvinyl chloride (PVC), polypropylene (PP), or polyethylene (PE), but the material is not limited to these, and may be silicone, polyurethane, nylon, and the like.

Figure 2:
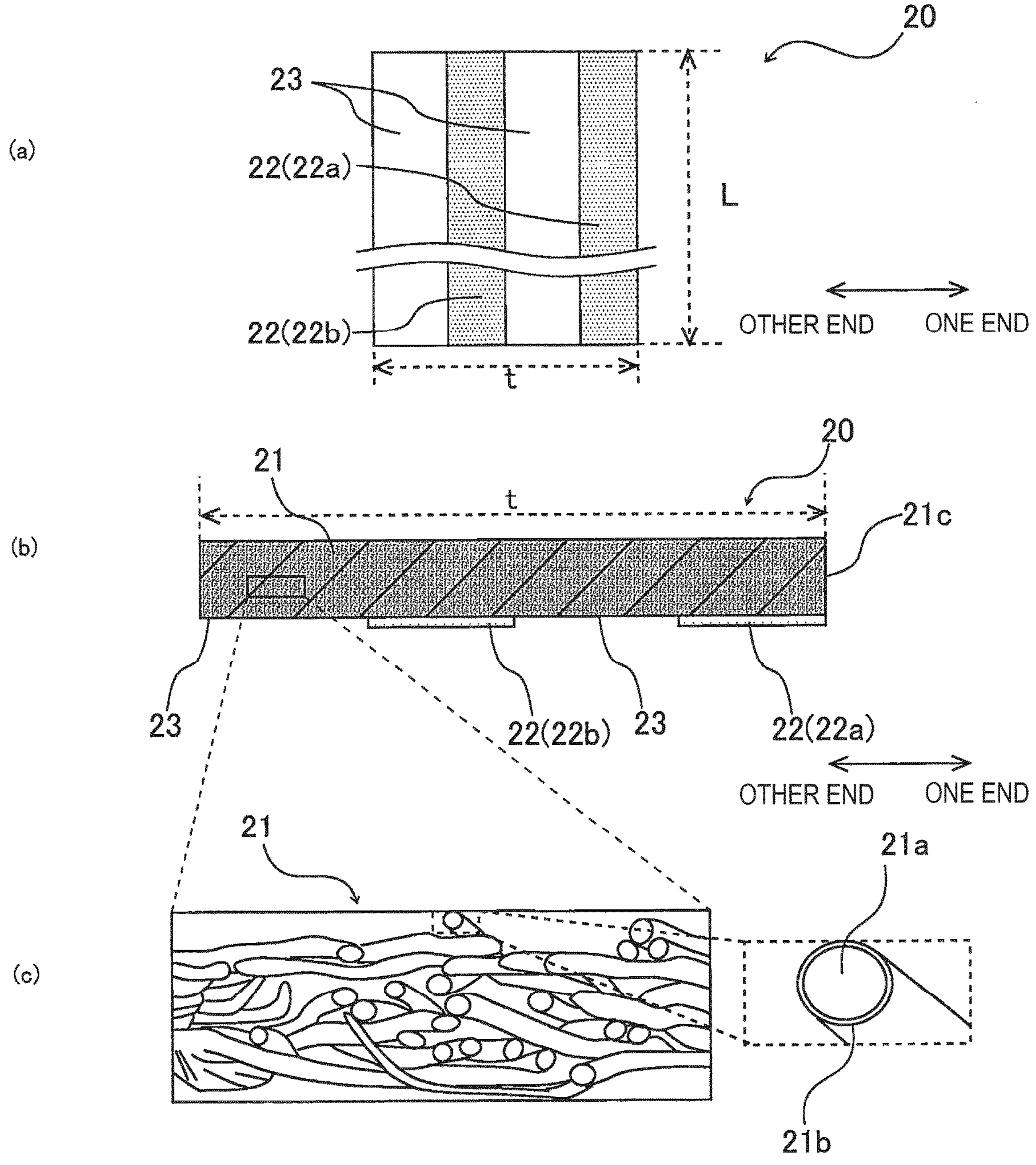
FIG. 2 is a configuration diagram showing a conductive nonwoven fabric tape shown in FIG. 1, in which (a) shows a plane on which an adhesive layer is formed, (b) shows a cross section orthogonal to a tape longitudinal direction, and (c) shows a partial enlarged view of (b)

FIG. 2 is a configuration diagram showing the conductive nonwoven fabric tape 20 shown in FIG. 1, in which (a) shows a plane on which an adhesive layer is formed, (b) shows a cross section orthogonal to a tape longitudinal direction, and (c) shows a partial enlarged view of (b). As shown in (a) of FIG. 2 and (b) of FIG. 2, the conductive nonwoven fabric tape 20 includes a conductive nonwoven fabric 21 and an adhesive layer 22 provided on one surface (front surface or back surface) of the conductive nonwoven fabric 21.

As shown in (c) of FIG. 2, the conductive nonwoven fabric 21 includes fibers 21*a* constituting a nonwoven fabric, and plated portions 21*b*. The nonwoven fabric is a sheet-shaped member in which the fibers 21*a* are intertwined without being woven. As shown in (c) of FIG. 2, the fibers 21*a* of the nonwoven fabric are formed as multiple layers in a thickness direction in terms of manufacturing process. The fibers 21*a* constituting the nonwoven fabric are made of, for example, polyethylene terephthalate (PET), PP, nylon, acrylic, glass fiber, carbon fiber, aramid fiber, polyarylate fiber, or the like.

The plated portion 21*b* is a conductive metal covering the fibers 21*a* constituting the nonwoven fabric. The plated portion 21*b* is made of, for example, copper, nickel, tin, silver, or an alloy of these metals. The plated portion 21*b* may be formed in a single layer on the fibers 21*a* constituting the nonwoven fabric or may be formed in a plurality of layers. Therefore, the plated portion 21*b* may be formed, for example, as copper (first layer) and tin (second layer) on the fibers 21*a* constituting the nonwoven fabric.

Further, as shown in (a) of FIG. 2 and (b) of FIG. 2, the adhesive layer 22 is partially formed on one surface of the conductive nonwoven fabric 21. In the example shown in (a) of FIG. 2 and (b) of FIG. 2, the conductive nonwoven fabric tape 20 has two adhesive layers 22 formed along a longitudinal direction of the conductive nonwoven fabric tape 20. When the conductive nonwoven fabric tape 20 is divided into two equal regions in the width direction, each adhesive layer 22 is provided on one end side of each divided region. A first adhesive layer 22*a* of the adhesive layers 22 is formed at one end of the conductive nonwoven fabric 21 and extends in the longitudinal direction with a predetermined width. A second adhesive layer 22*b* is formed slightly toward the other end of the conductive nonwoven fabric 21 from the center and extends in the longitudinal direction with a predetermined width. As described above, a plurality of adhesive layers 22 are formed in linear shapes that are continuous at least in the longitudinal direction.

Figure 3:
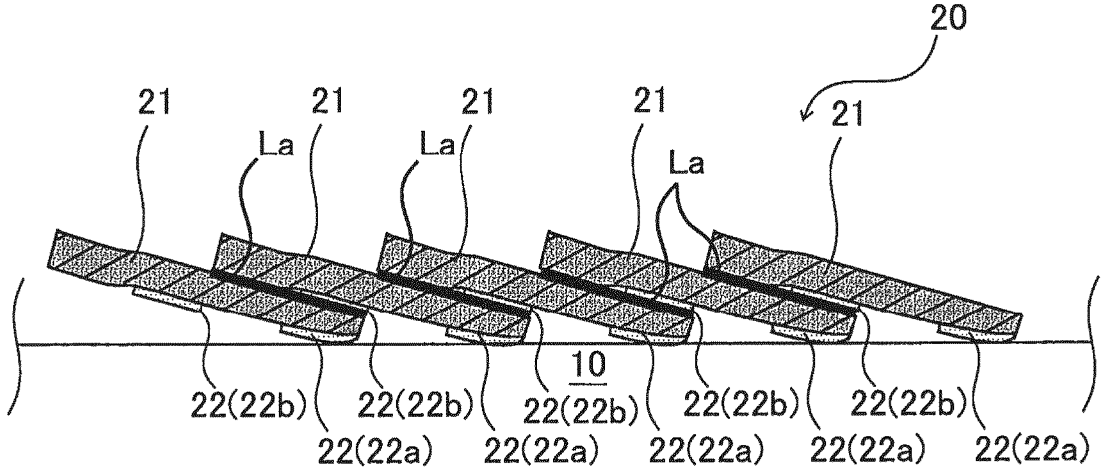
FIG. 3 is a cross-sectional view taken along a longitudinal direction of the shielding wire shown in FIG. 1.

FIG. 3 is a cross-sectional view taken along a longitudinal direction of the shielding wire 1 shown in FIG. 1. As shown in FIG. 3, when the conductive nonwoven fabric tape 20 is wound in a spiral shape around the electric wire 10, the adhesive layer 22 adheres to the electric wire 10 and also adheres to the conductive nonwoven fabric tape 20 that is wound in a spiral shape in an overlapping manner. That is, in the case of the conductive nonwoven fabric tape 20 shown in FIG. 2, the first adhesive layer 22*a* adheres to the electric wire 10 when the conductive nonwoven fabric tape 20 is wound. The second adhesive layer 22*b* adheres to the overlapping conductive nonwoven fabric tape 20 in lapped portions La where the conductive nonwoven fabric tapes 20 overlap each other. Further, the second adhesive layer 22*b* is provided in a part of the lapped portion La and is not provided in the remaining part. Accordingly, in the conductive nonwoven fabric tape 20 shown in FIG. 2, the conductive nonwoven fabrics 21 are brought into contact with each other and are conductive in conductive portions 23 where the adhesive layer 22 is not formed.

The shielding wire 1 according to the present embodiment has improved shielding performance as compared with the reference example in which the adhesive layer 22 is provided on the entire conductive nonwoven fabric 21.

Figure 4:
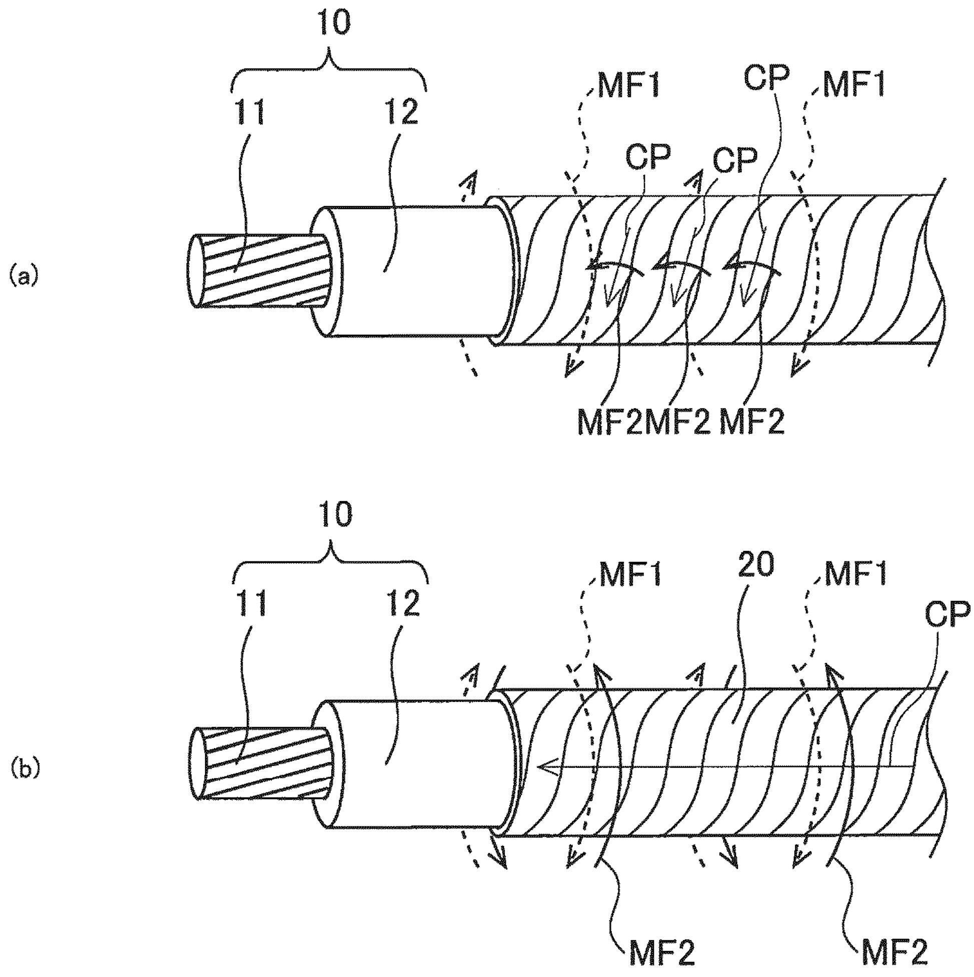
FIG. 4 is an image diagram showing how a magnetic field is generated, in which (a) shows a state of a magnetic field in a reference example, and (b) shows a state of a magnetic field in the present embodiment.

FIG. 4 is an image diagram showing how a magnetic field is generated, in which (a) shows a state of a magnetic field in a reference example, and (b) shows a state of a magnetic field in the present embodiment. First, as shown in (a) of FIG. 4 and (b) of FIG. 4, in the electric wire 10, a current flows in a direction in which the conductor 11 extends. Therefore, a magnetic field MF1 (see the broken line) in a direction orthogonal to the current is generated.

Here, in the reference example shown in (a) of FIG. 4, the adhesive layer 22 is provided on the entire conductive nonwoven fabric 21. Therefore, the adhesive layer 22 is interposed between the conductive nonwoven fabrics 21 in the lapped portions La where the conductive nonwoven fabric tape overlaps. Accordingly, the conductive nonwoven fabric tape shown in the reference example forms a conductive path CP in a spiral shape. In this case, a magnetic field MF2 (see the solid line) is generated in a direction orthogonal to a spiral direction in the conductive nonwoven fabric tape side. The magnetic field MF2 cannot cancel out the magnetic field MF1 generated by the current flowing through the conductor 11.

On the other hand, in the conductive nonwoven fabric tape 20 according to the present embodiment, as described with reference to FIG. 3, the conductive nonwoven fabrics 21 are electrically connected to each other via the conductive portion 23 in the lapped portion La. Therefore, as shown in (b) of FIG. 4, the conductive nonwoven fabric tape 20 forms a conductive path CP along the longitudinal direction of the electric wire 10. Accordingly, the shielding wire 1 according to the present embodiment can generate the magnetic field MF2 (see the solid line) that cancels out the magnetic field MF1 (see the broken line) generated by the current flowing through the conductor 11.

In particular, in the shielding wire 1 according to the present embodiment, proportions of the adhesive layer 22 and the conductive portion 23 are optimized, and the magnetic field MF2 that cancels out the magnetic field MF1 is appropriately generated, thereby enabling the shielding effect to be optimally exhibited.

Specifically, in the shielding wire 1 according to the present embodiment, when a width of the conductive nonwoven fabric tape 20 is t (see (a) of FIG. 2 and (b) of FIG. 2), a length of the conductive nonwoven fabric tape 20 is L (see (a) of FIG. 2), and an area of the adhesive layer 22 in the conductive nonwoven fabric tape 20 is S,

[Math 1]

$$S/tL \leqq 0.5 \quad (1)$$

is satisfied. tL indicates a total area of the conductive nonwoven fabric tape 20. Accordingly, as shown in Formula (1), in the conductive nonwoven fabric tape 20 according to the present embodiment, an area ratio of the adhesive layer 22 is 50% or less.

Further, in the shielding wire 1 according to the present embodiment, while the conductive nonwoven fabric tape 20 is wound in a spiral shape around the electric wire 10, when an area of the lapped portion La where the conductive nonwoven fabric tape 20 laps each other is defined as S1, and an area of the adhesive layer 22 in the lapped portion La is defined as S2,

[Math 2]

$$(S1-S2)/tL \geqq 0.25 \quad (2)$$

is satisfied. Here, S1−S2 is obtained by subtracting the area of the adhesive layer 22 from the area of the lapped portion La, and can be said to be the area of the conductive portion 23. As described above, tL indicates the total area of the conductive nonwoven fabric tape 20. Thus, Formula (2) represents a ratio of the conductive portion 23 in the lapped portion La to the entire conductive nonwoven fabric tape 20. That is, Formula (2) indicates that a conduction ratio when the conductive nonwoven fabric tape 20 is wound in a spiral shape around the electric wire 10 is 25% or more.

By satisfying the above Formula (1) and Formula (2), the conductive nonwoven fabric tape 20 according to the present embodiment can form the conductive path CP extending in the longitudinal direction of the electric wire 10 as shown in (b) of FIG. 4. In addition, since the proportions of the adhesive layer 22 and the conductive portion 23 are also optimized, the magnetic field MF1 generated by the current flowing through the conductor 11 can be easily cancelled out by the magnetic field MF2 generated by the conductive path CP while the conductive nonwoven fabric tape 20 is suitably attached to the electric wire 10.

Here, in the example shown in FIG. 3, the conductive nonwoven fabric tape 20 is half-wrapped. However, the shielding wire 1 according to the present embodiment is not limited to a half-wrap, and may be any type as long as Formula (1) and Formula (2) are satisfied. In particular, the shielding wire 1 according to the present embodiment may use any conductive nonwoven fabric tape 20 as long as Formula (1) and Formula (2) are satisfied. Accordingly, it is difficult for the conductive nonwoven fabric tape 20 to become uniform one article as disclosed in Japanese Patent Application No. 2022-191625, and versatility is enhanced.

The conductive nonwoven fabric tape 20 used for spiral winding as described above is formed by appropriately forming the adhesive layer 22 on the conductive nonwoven fabric 21 having a width exceeding t, and then cutting the conductive nonwoven fabric 21 along the longitudinal direction to have a width of t. In addition, when the conductive nonwoven fabric tape 20 is used for vertical attachment, the conductive nonwoven fabric tape 20 may be made into a product without being cut with the width exceeding t. A method for manufacturing the conductive nonwoven fabric tape 20 is not limited to this, and for example, the conductive nonwoven fabric tape 20 used for spiral winding may be formed by cutting the conductive nonwoven fabric 21 to the width of t in advance and then forming the adhesive layer 22 thereon.

Figure 5:
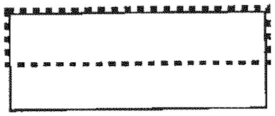
FIG. 5 is a table showing Example 1 to Example 3 and Comparative Example 1 to Comparative Example 4.
Figure 5:
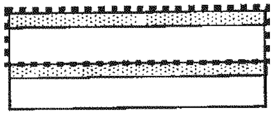
Figure 5:
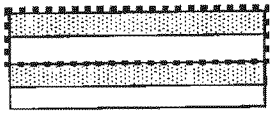
Figure 5:
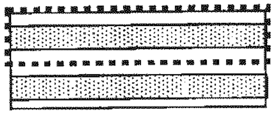
Figure 5:
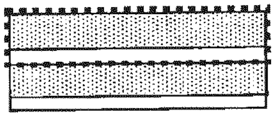
Figure 5:
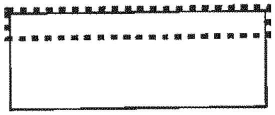
Figure 5:
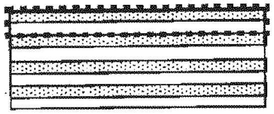

Examples and Comparative Examples will be described below. FIG. 5 is a table showing Example 1 to Example 3 and Comparative Example 1 to Comparative Example 4.

As shown in FIG. 5, the conductive nonwoven fabric tape in the shielding wire according to Example 1 has two adhesive layers extending in the longitudinal direction. Similar to the two adhesive layers shown in FIG. 2, one is provided at one end in the width direction of the conductive nonwoven fabric tape, and the other is provided slightly toward the other end of the conductive nonwoven fabric tape from the center in the width direction. Further, in the conductive nonwoven fabric tape according to Example 1, the conduction ratio shown in Formula (2) is 35%, and an adhesion ratio shown in Formula (1) is 30%. A lap width (width of the lapped portion) is set to ½ from one end of the conductive nonwoven fabric tape (the area of the lapped portion is ½ of the total area). The shield resistance of such a conductive nonwoven fabric tape wound in a spiral shape was 2.27 [Ω/m].

In the shielding wire shown in Example 2, the conductive nonwoven fabric tape is similar to that in Example 1, but the width of the adhesive layer is made larger. The conduction ratio shown in Formula (2) is 25%, and the adhesion ratio shown in Formula (1) is 50%. The lap width is set to ½ from the one end of the conductive nonwoven fabric tape. The shield resistance of such a conductive nonwoven fabric tape wound in a spiral shape was 2.29 [Ω/m].

In the shielding wire shown in Example 3, the conductive nonwoven fabric tape is similar to that in Example 2, but the conduction ratio shown in Formula (2) is 25%, and the adhesion ratio shown in Formula (1) is 50%. However, one adhesive layer is formed at the center of one end side (one end half in the width direction), and the other adhesive layer is formed at the center of the other end side (the other end half in the width direction). The shield resistance of such a conductive nonwoven fabric tape wound in a spiral shape was 2.61 [Ω/m].

In the shielding wire shown in Comparative Example 1, the conductive nonwoven fabric (which does not have an adhesive layer and is not a conductive nonwoven fabric tape) has no adhesive layer. Therefore, in the conductive nonwoven fabric according to Comparative Example 1, the conduction ratio shown in Formula (2) is 50%, and the adhesion ratio shown in Formula (1) is 0%. The lap width is set to ½ from the one end. The shield resistance of such a conductive nonwoven fabric wound in a spiral shape was 1.52 [Ω/m].

In the shielding wire shown in Comparative Example 2, the conductive nonwoven fabric tape is similar to that in Example 2, but the width of the adhesive layer is made larger. Therefore, in Comparative Example 2, the conduction ratio shown in Formula (2) is 15%, and the adhesion ratio shown in Formula (1) is 70%. The lap width is set to ½ from the one end. The shield resistance of such a conductive nonwoven fabric tape wound in a spiral shape was 4.3 [Ω/m].

In the shielding wire shown in Comparative Example 3, the conductive nonwoven fabric (which does not have an adhesive layer and is not a conductive nonwoven fabric tape) is the same as in Comparative Example 1 (having no adhesive layer). In the conductive nonwoven fabric according to Comparative Example 3, the conduction ratio shown in Formula (2) is 25%, and the adhesion ratio shown in Formula (1) is 0%. In Comparative Example 3, the lap width is set to ¼ from the one end. The shield resistance of such a conductive nonwoven fabric wound in a spiral shape was 1.48 [Ω/m].

In the shielding wire shown in Comparative Example 4, the conductive nonwoven fabric tape has four adhesive layers extending along the longitudinal direction. When the conductive nonwoven fabric tape is divided into four equal regions in the width direction, each of the four adhesive layers is provided on one end side of each divided region. Further, in the conductive nonwoven fabric tape according to Comparative Example 4, the conduction ratio shown in Formula (2) is 13%, and an adhesion ratio shown in Formula (1) is 50%. The lap width is set to ¼ from the one end. The shield resistance of such a conductive nonwoven fabric tape wound in a spiral shape was 4.34 [Ω/m].

In the above, an 8d coaxial wire was used for the electric wire provided inside the conductive nonwoven fabric tape. Further, the adhesive layer was formed using a double-sided tape (product number #8080) manufactured by DIC Corporation. The width of the conductive nonwoven fabric tape was 20 mm. Further, a grounding part was attached by winding a connector around it and then tightening a tie band over the conductive nonwoven fabric tape. A tightening force of the tie band is within a range of 165 N to 220 N.

Figure 6:
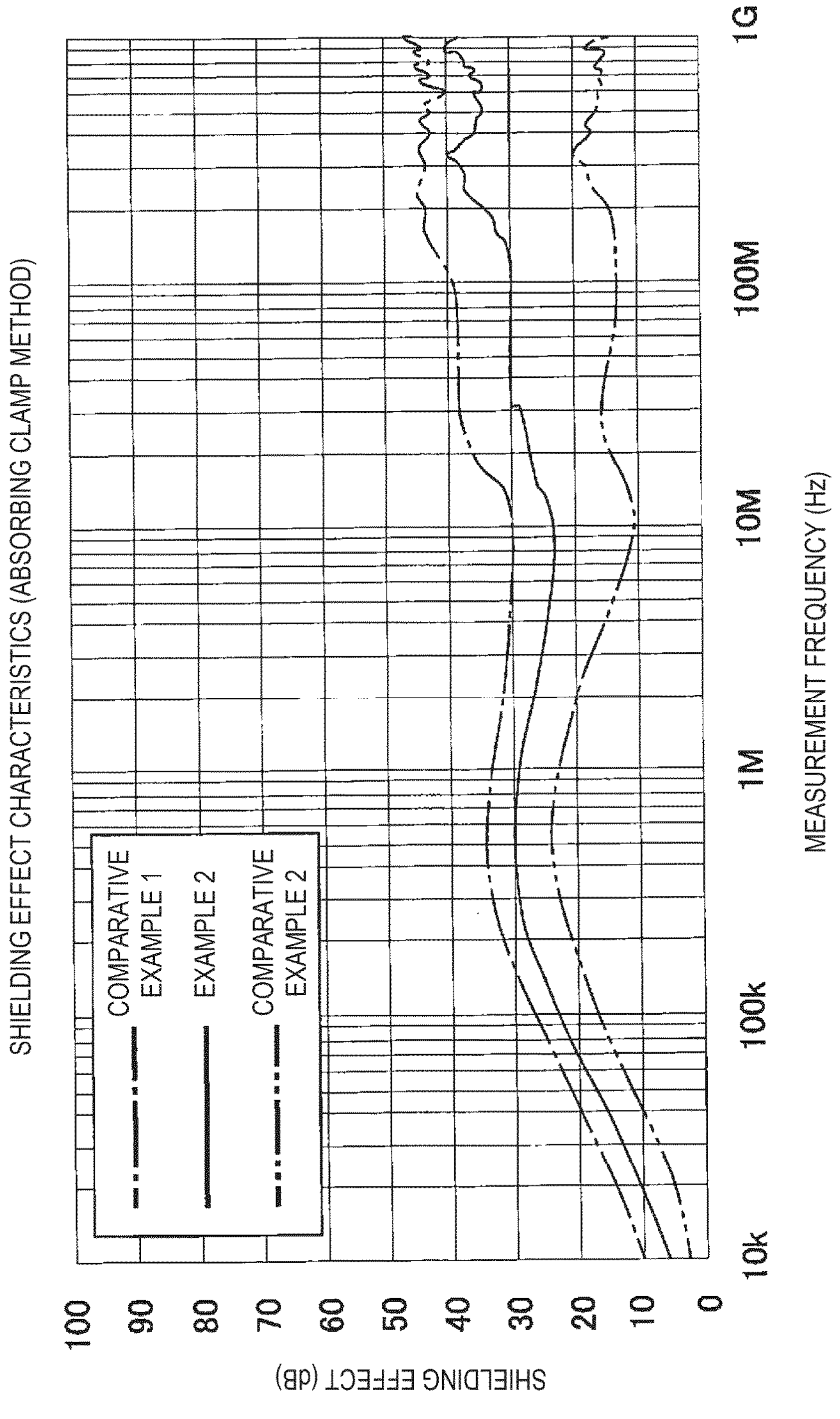
FIG. 6 is a graph showing shielding effects of shielding wires according to Example 2 and Comparative Examples 1 and 2.

FIG. 6 is a graph showing shielding effects of shielding wires according to Example 2 and Comparative Examples 1 and 2. In FIG. 6, the shielding effects of Examples 1 and 3 are the same as that of Example 2, and thus the illustration is omitted. Similarly, the shielding effect of Comparative Example 3 is the same as that of Comparative Example 1, and the shielding effect of Comparative Example 4 is the same as that of Comparative Example 2, and thus the illustration thereof is omitted.

As shown in FIG. 6, the shielding wire according to Comparative Example 1 exhibits the best shielding effect. This is because the conductive nonwoven fabric does not have an adhesive layer, and therefore a conductive path extending in the longitudinal direction can be suitably formed. However, in the shielding wire according to Comparative Example 1, since the conductive nonwoven fabric having no adhesive layer is used, the lapped portion opens at the time of bending, and a good shielding effect as shown in FIG. 6 cannot be obtained. When a conductive nonwoven fabric having no adhesive layer is used, the position of the conductive nonwoven fabric may also become unstable, and a good shielding effect may no longer be obtained after long-term use and the like.

Further, the shielding wire according to Example 2 has the second best shielding effect after the shielding wire according to Comparative Example 1. This is because the shielding wire according to Example 2 satisfies the conditions of Formula (1) and Formula (2), and therefore the shield resistance is also within a range of 1.5 [Ω/m] or more and 4.0 [Ω/m] or less, and a conductive path extending in the longitudinal direction can be formed relatively well. Further, the adhesive layer adheres not only to the electric wire but also to the conductive nonwoven fabric tape. Accordingly, it is possible to reduce the possibility that the lapped portion is opened at the time of bending or the position of the conductive nonwoven fabric tape is displaced, and a relatively good shielding effect is easily obtained even in bending, long-term use, and the like.

The shielding wire according to Comparative Example 2 has the lowest shielding effect. The shielding wire according to Comparative Example 2 does not satisfy either of the conditions of Formula (1) and Formula (2), and the shield resistance exceeds 4.0 [Ω/m]. Therefore, even if a conductive path extending in the longitudinal direction can be formed, it is not be enough to cancel out the magnetic field, and it is difficult to say that a good shielding effect is obtained.

Figure 7:
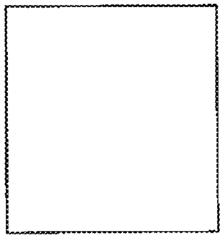
FIG. 7 is a table showing shielding wires when a conductive nonwoven fabric or a conductive nonwoven fabric tape is attached vertically.
Figure 7:
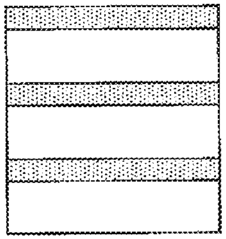
Figure 7:
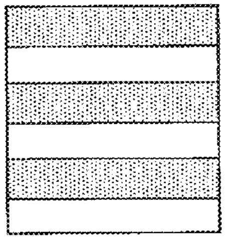
Figure 7:
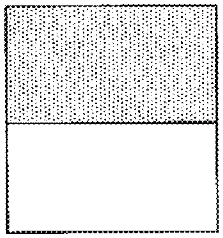
Figure 7:
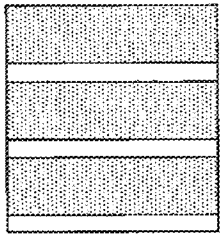
Figure 7:
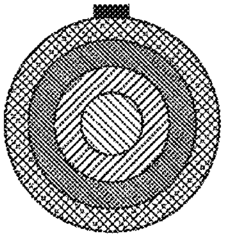
Figure 7:
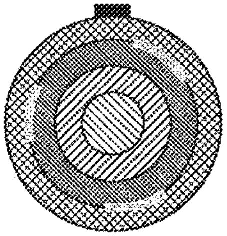
Figure 7:
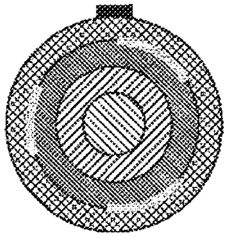
Figure 7:
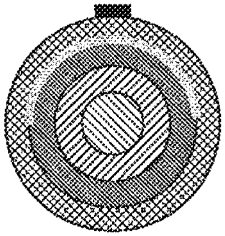
Figure 7:
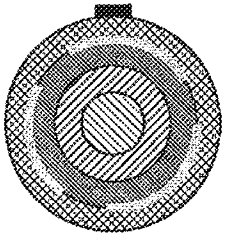

FIG. 7 is a table showing shielding wires when a conductive nonwoven fabric or a conductive nonwoven fabric tape is attached vertically.

First, as shown in FIG. 7, a shielding wire according to Vertical Attachment Example 1 uses a conductive nonwoven fabric having no adhesive layer as a shielding layer. Therefore, the adhesion ratio shown in Formula (1) is 0%. The shield resistance of such a vertically attached conductive nonwoven fabric was 0.51 [Ω/m].

In a shielding wire according to Vertical Attachment Example 2, the conductive nonwoven fabric tape has three adhesive layers extending along the longitudinal direction. When the conductive nonwoven fabric tape is divided into three equal regions in the width direction, each of the three adhesive layers is provided on one end side of each divided region. Further, in the conductive nonwoven fabric tape according to Vertical Attachment Example 1, the adhesion ratio shown in Formula (1) is 30%. The shield resistance of such a conductive nonwoven fabric tape was 0.38 [Ω/m].

In the shielding wire according to Vertical Attachment Example 3, the conductive nonwoven fabric tape is similar to that in Vertical Attachment Example 2, but the width of the adhesive layer is made larger, and the adhesion ratio shown in Formula (1) is 50%. The shield resistance of such a conductive nonwoven fabric tape was 0.46 [Ω/m].

In a shielding wire according to Vertical Attachment Example 4, the conductive nonwoven fabric tape has one adhesive layers extending along the longitudinal direction. The one adhesive layer is formed from one end to the other end of the conductive nonwoven fabric tape. In the conductive nonwoven fabric tape according to Vertical Attachment Example 4, the adhesion ratio shown in Formula (1) was 50%, and the shield resistance of the vertically attached conductive nonwoven fabric tape was 0.52 [Ω/m].

In a shielding wire according to Vertical Attachment Example 5, the conductive nonwoven fabric tape is similar to that in Vertical Attachment Example 3, but the width of the adhesive layer is made larger, and the adhesion ratio shown in Formula (1) is 70%. The shield resistance of such a conductive nonwoven fabric tape was 1.15 [Ω/m].

Figure 8:
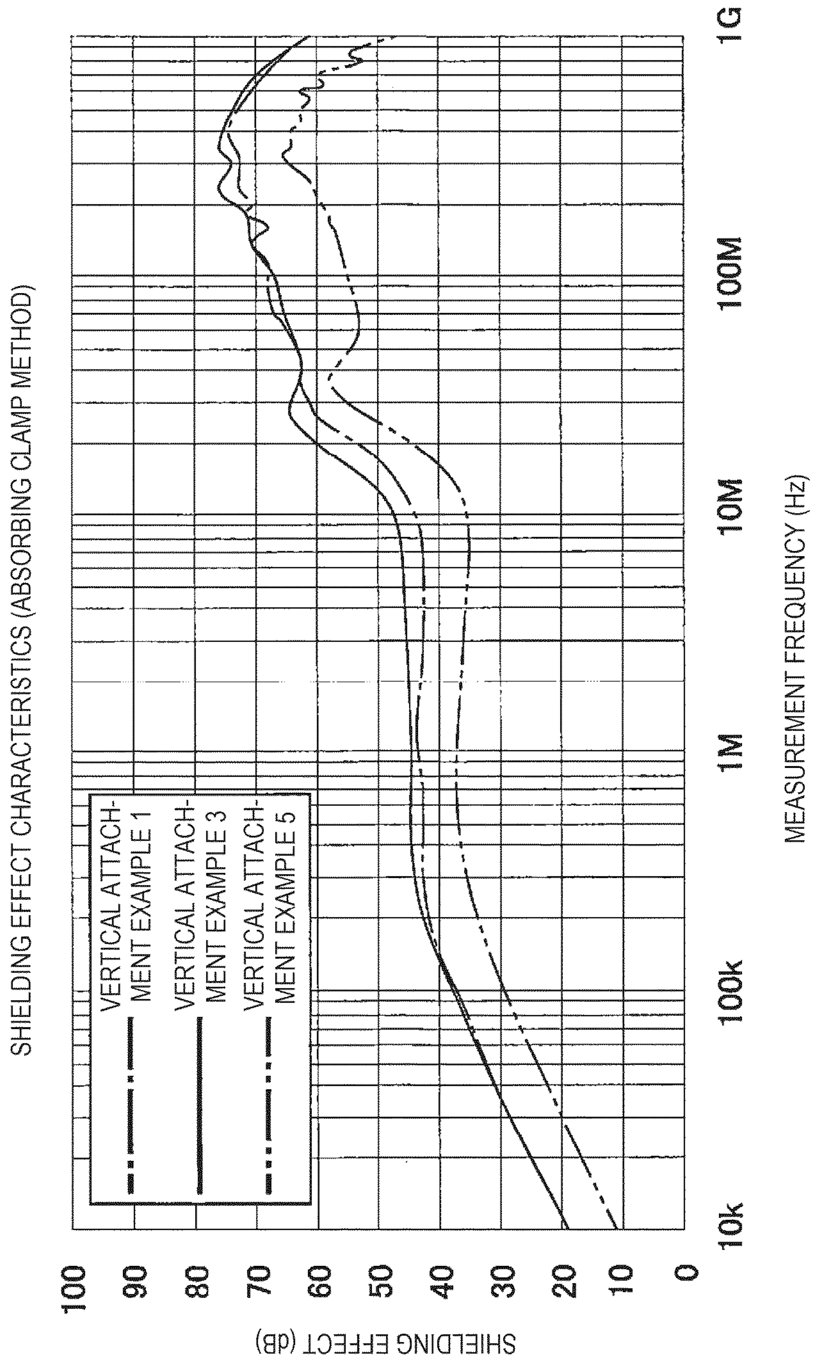
FIG. 8 is a graph showing shielding effects of shielding wires according to Vertical Attachment Examples 1, 3, and 5.

FIG. 8 is a graph showing shielding effects of shielding wires according to Vertical Attachment Examples 1, 3, and 5. In FIG. 8, the shielding effects of Vertical Attachment Examples 2 and 4 are the same as that of Vertical Attachment Example 3, and thus the illustration thereof is omitted.

As shown in FIG. 8, the shielding wire according to Vertical Attachment Example 1 exhibits the best shielding effect. In this regard, the shielding wire according to Vertical Attachment Example 3 also exhibits a shielding effect as good as that of the shielding wire according to Vertical Attachment Example 1. In addition, the shielding wire according to Vertical Attachment Example 5 has a lower shielding effect as compared with Vertical Attachment Examples 1 and 3.

Here, it is clear that, of Vertical Attachment Examples 1 to 5, the conductive nonwoven fabric tapes shown in Vertical Attachment Examples 2 to 4 satisfy Formula (1). For the conductive nonwoven fabric tapes according to Vertical Attachment Examples 2 to 4, Formula (2) can be satisfied depending on a lapping ratio of the spiral winding (Formula (2) can be satisfied depending on how the lapped portion is designed). It was found that the conductive nonwoven fabric tapes shown in Vertical Attachment Examples 2 to 4, even when attached vertically, provided the same shielding effect as the conductive nonwoven fabric of Vertical Attachment Example 1, and were therefore highly versatile.

In this manner, according to the shielding wire 1 of the present embodiment, the adhesive layer 22 adheres to the electric wire 10 and also adheres to the conductive nonwoven fabric tape 20 which is wound in a spiral shape and overlapped. Therefore, the conductive nonwoven fabric tape 20 adheres to the electric wire 10 to prevent it from displacement and the like, and also adheres to the conductive nonwoven fabric tape 20 to maintain the wrapped state. In addition, when the width of the conductive nonwoven fabric tape 20 is t, the length of the conductive nonwoven fabric tape 20 is L, and the area of the adhesive layer 22 in the conductive nonwoven fabric tape 20 is S, the shielding wire 1 satisfies Formula (1). Therefore, the ratio of the adhesive layer 22 in the conductive nonwoven fabric tape 20 can be optimized. Further, when the area of the lapped portion La is S1 and the area of the adhesive layer 22 in the lapped portion La is S2, Formula (2) is satisfied. Therefore, the area (S1−S2) in which conduction is secured by the conductive portion 23 in the lapped portion La is optimized, and the conductive path CP in the longitudinal direction is secured even when the conductive nonwoven fabric tape 20 is wound in a spiral shape. In particular, the conductive nonwoven fabric tape 20 is not limited to one in which the adhesive layer 22 is formed only on one end, and as long as Formula (1) and Formula (2) are satisfied, it is not particularly limited in shape and the like, and is unlikely to be one-of-a-kind, and depending on the product, it can be used in a vertical arrangement. Therefore, it is possible to provide a shielding wire 1 capable of increasing the versatility of a conductive nonwoven fabric tape 20 and reducing a decrease in the shielding effect.

In addition, the conductive nonwoven fabric tape 20 has a plurality of adhesive layers 22 formed continuously and linearly at least in the longitudinal direction. Therefore, it is possible to provide the shielding wire 1 in which the adhesive layer 22 can be easily formed on the conductive nonwoven fabric 21, and the conductive nonwoven fabric tape 20 can be appropriately wound around the electric wire in a state of being not easily peeled off even when the conductive nonwoven fabric tape 20 is vertically attached.

Although the present disclosure is described above based on the embodiments, the present disclosure is not limited to the embodiments described above, modifications may be made without departing from the gist of the present disclosure, and known or well-known techniques may be combined.

Figure 9:
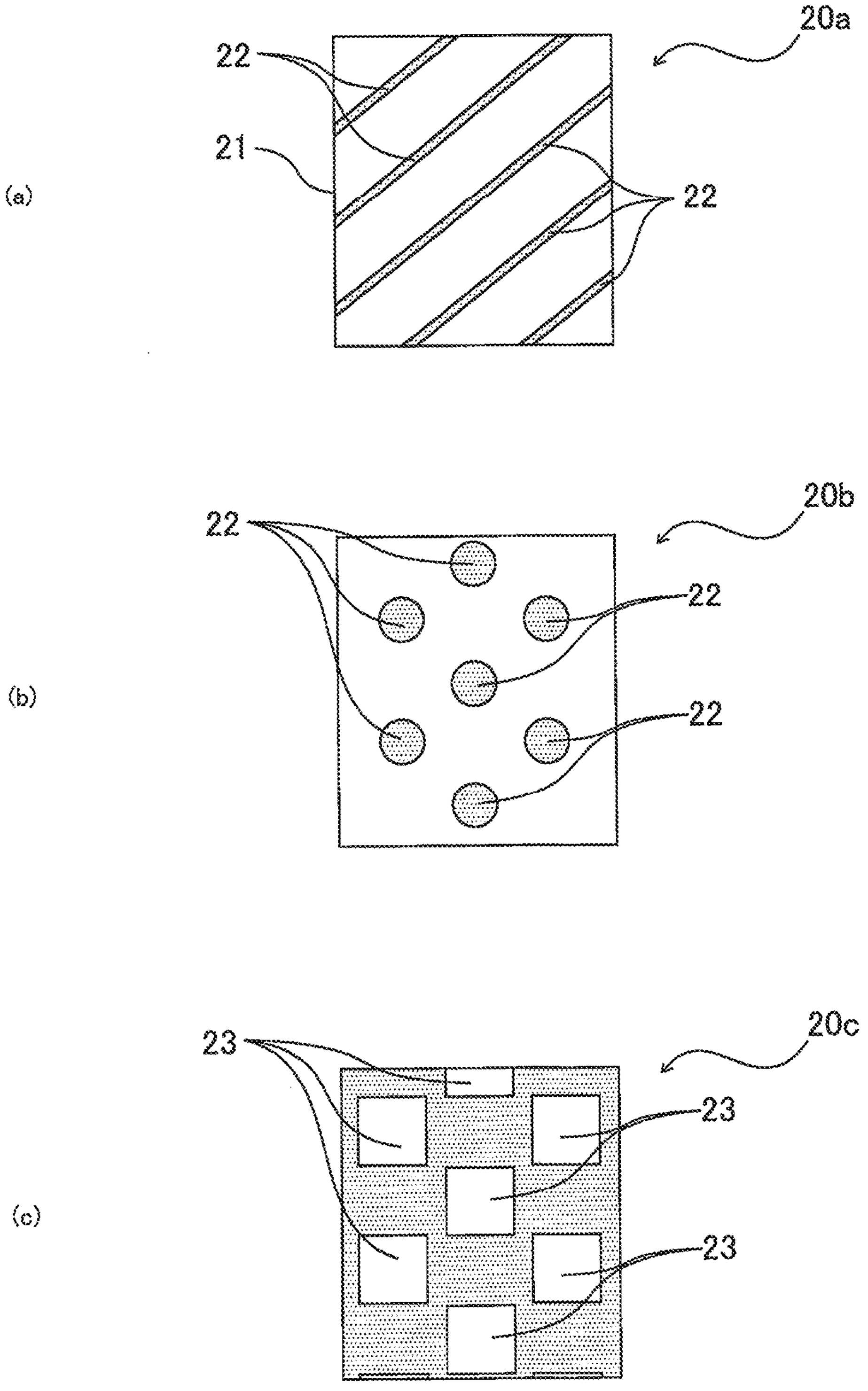
FIG. 9 is a plan view showing conductive nonwoven fabric tapes according to modified examples, in which (a) shows a first example, (b) shows a second example, and (c) shows a third example.

FIG. 9 is a plan view showing conductive nonwoven fabric tapes according to modified examples, in which (a) shows a first example, (b) shows a second example, and (c) shows a third example. As shown in (a) of FIG. 9, a conductive nonwoven fabric tape 20*a* is not limited to the case where the plurality of adhesive layers 22 extend along the longitudinal direction, and may be configured to have elements extending at least in the longitudinal direction, for example, extending in an oblique direction. This also makes it easy to form the adhesive layer 22 on the conductive nonwoven fabric 21, for example by using double-sided tape, and also makes it possible to appropriately wind the conductive nonwoven fabric tape 20 around the electric wire 10 in a state of being not easily peeled off even when the conductive nonwoven fabric tape 20 is vertically attached.

As shown in (b) of FIG. 9, in a conductive nonwoven fabric tape 20*b*, the adhesive layer 22 may be formed discontinuously and at equal intervals in the longitudinal direction. Here, the equal interval is not necessarily limited to the case where the adhesive layers 22 separated in the longitudinal direction are arranged at regular intervals. For example, the equal interval includes, for example, a case where the first and second adhesive layers 22 separated in the longitudinal direction are arranged at a first interval, the second and third adhesive layers 22 separated in the longitudinal direction are arranged at a second interval, and this is repeated. This is because even when the adhesive layer 22 is discontinuously formed, the same effect can be obtained by satisfying the Formulas (1) and (2).

Furthermore, as shown in (c) of FIG. 9, in a conductive nonwoven fabric tape 20*c*, the conductive portions 23 may be formed discontinuously and at equal intervals in the longitudinal direction. Here, the equal interval is the same as that shown in (b) of FIG. 9. This is because even when the conductive portion 23 is discontinuously formed, the same effect can be obtained by satisfying the Formulas (1) and (2).

The invention claimed is:

1. A shielding wire comprising:

an electric wire; and a conductive nonwoven fabric tape wound around the electric wire, wherein the conductive nonwoven fabric tape includes a conductive nonwoven fabric that is a nonwoven fabric having electrical conductivity and an adhesive layer formed on one surface of the conductive nonwoven fabric, wherein in the conductive nonwoven fabric tape, the adhesive layer is partially formed on the conductive nonwoven fabric, wherein when the conductive nonwoven fabric tape is wound in a spiral shape around the electric wire, the adhesive layer adheres to the electric wire and also adheres to the conductive nonwoven fabric tape that overlaps when wound in a spiral shape, and wherein relationships of:

$$S/tL \leqq 0.5;$$

and $$(S1-S2)/tL \geqq 0.25$$

are satisfied, in which t is a width of the conductive nonwoven fabric tape wound in a spiral shape, L is a length of the conductive nonwoven fabric tape, S is an area of the adhesive layer in the conductive nonwoven fabric tape, S1 is an area of a lapped portion where the conductive nonwoven fabric tape overlaps when the conductive nonwoven fabric tape is wound in a spiral shape, and S2 is an area of the adhesive layer in the lapped portion.

2. The shielding wire according to claim 1, wherein the adhesive layer includes a plurality of adhesive layers, and wherein in the conductive nonwoven fabric tape, the plurality of adhesive layers are formed continuously and linearly at least in a longitudinal direction.

3. The shielding wire according to claim 1, wherein in the conductive nonwoven fabric tape, the adhesive layer or a conductive portion where the adhesive layer is not formed is formed discontinuously and at equal intervals in a longitudinal direction.

* * * * *